(12) United States Patent
Hyuga

(10) Patent No.: US 7,199,769 B2
(45) Date of Patent: Apr. 3, 2007

(54) EXPOSURE APPARATUS

(75) Inventor: Hiroaki Hyuga, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 539 days.

(21) Appl. No.: 10/716,875

(22) Filed: Nov. 20, 2003

(65) Prior Publication Data

US 2004/0145546 A1 Jul. 29, 2004

(30) Foreign Application Priority Data

Nov. 21, 2002 (JP) ............................. 2002-337771

(51) Int. Cl.
*G09G 3/30* (2006.01)
(52) U.S. Cl. ..................... 345/77; 347/224; 358/1.8
(58) Field of Classification Search ............ 345/76–81; 315/169.3; 347/224; 358/1.8
See application file for complete search history.

(56) References Cited

U.S. PATENT DOCUMENTS 6,541,921 B1 * 4/2003 Luciano et al. .......... 315/169.3
6,633,270 B2 * 10/2003 Hashimoto ................... 345/76
2004/0021423 A1 * 2/2004 Jongman et al. ......... 315/169.1

FOREIGN PATENT DOCUMENTS

JP 2000-103114 A 4/2000

* cited by examiner

*Primary Examiner*—Amr A. Awad
*Assistant Examiner*—Tom Sheng
(74) *Attorney, Agent, or Firm*—Sughrue Mion, PLLC

(57) ABSTRACT

Provided is an exposure apparatus capable of suppressing deviation of color balance by simple apparatus construction. Further, provided is an exposure apparatus capable of performing exposure with high energy utilization efficiency. The luminous intensity and emission time of each organic EL element of an organic EL array are set according to inputted image data, and the set values of luminous intensity and emission time are stored in a RAM. The organic EL elements of respective colors have different luminous intensities set so that degradation rates are substantially the same among three colors of R, G, and B. Next, control signals are generated based on the set values of the luminous intensities and emission times, and the generated control signals are outputted.

24 Claims, 14 Drawing Sheets

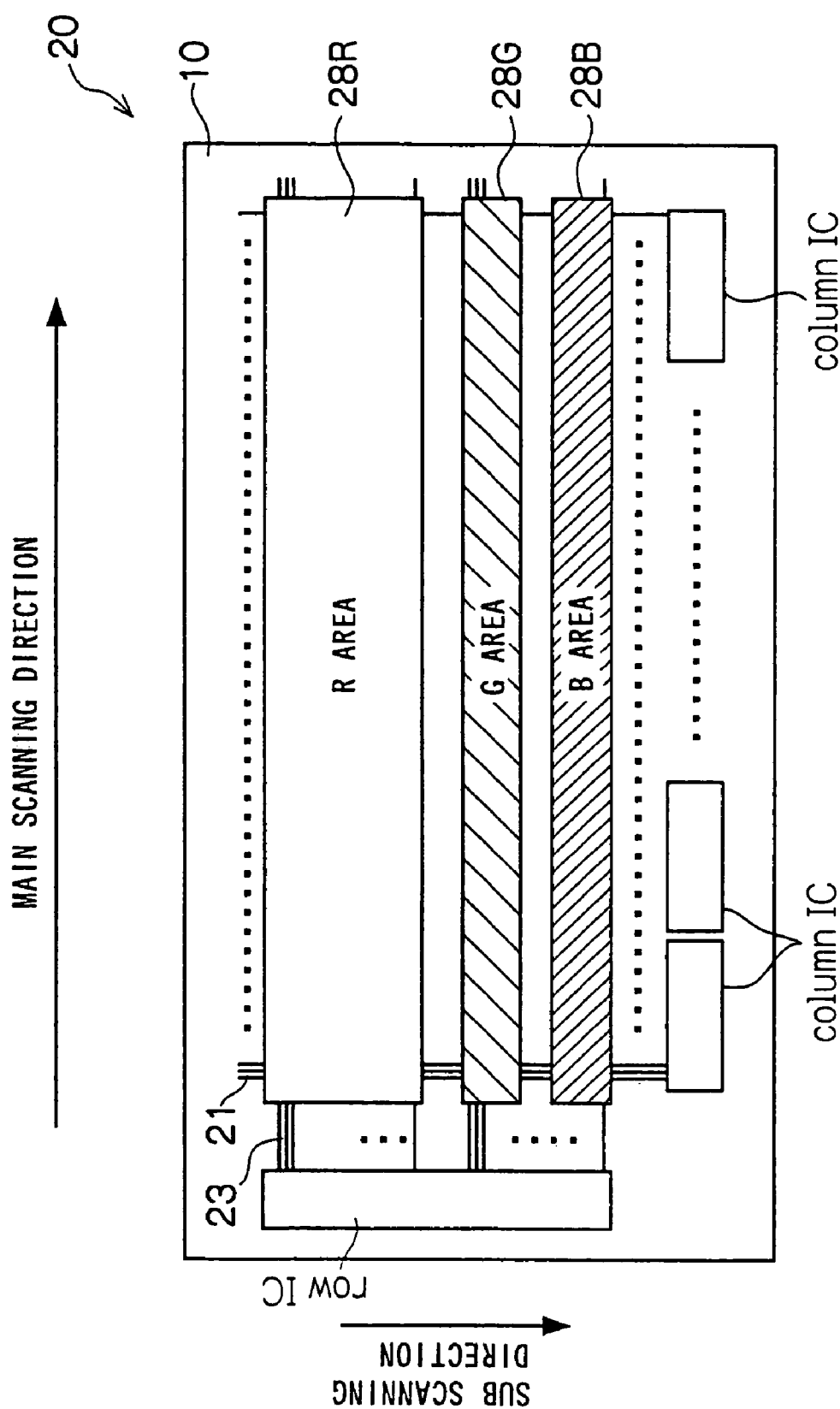

WITHOUT OCCURRENCE OF STREAKS ALONG SUB SCANNING DIRECTION

WITH OCCURRENCE OF STREAKS ALONG SUB SCANNING DIRECTION

EXPOSURE APPARATUS

CROSS-REFERENCE TO RELATED APPLICATION

This application claims priority under 35 USC 119 from Japanese Patent Application No. 2002-337771, the disclosure of which is incorporated by reference herein.

BACKGROUND OF THE INVENTION

1. Field of the Invention

The present invention relates to an exposure apparatus, specifically, to an exposure apparatus for exposing a photosensitive material to light emitted from an array of light emitting elements.

2. Description of the Related Art

An organic EL (electroluminescent) element using a fluorescent organic material as a light emitting layer has the advantages that it can be manufactured more easily than other light emitting elements, it can constitute a thin and lightweight light emitting device, etc., and thereby, research and development as a thin display element has been conventionally promoted. Recently, since an organic EL element achieving high performance also in luminous brightness, luminous efficiency, and durability comparable to a light emitting diode (LED) has been obtained, application to an exposure apparatus for exposing a photosensitive material such as a silver halide photosensitive material is under study.

As shown in FIG. 12, for example, an exposure apparatus using organic EL elements comprises an organic EL element array in which plural sets (two sets in FIG. 12) of rows of elements, which are formed by arranging plural organic EL elements 80 emitting light in respective colors of red (R), green (G), and blue (B) with respect to each color along a main scanning direction, are arranged in a sub scanning direction with the rows of elements of three colors R, G, and B as a set. Note that, in FIG. 12, the organic EL elements 80 of the respective colors R, G, and B are shown by being assigned with letters of the alphabet (R/G/B) indicating corresponding colors at ends of signs for distinction. A latent image of a full color image is formed by moving this exposure apparatus relative to a photosensitive material.

The luminous intensities of the organic EL elements 80R, 80G, and 80B of the respective colors R, G, and B are determined according to exposure sensitivity of the photosensitive material. However, in the case where luminous intensities are different among elements that constitute the organic EL element array, a difference is caused in degradation amounts, and color tone is drifted out gradually (color balance is deteriorated) with use of the exposure apparatus. As a result, a method for making the magnitude of degradation constant by using an organic element array, in which a number of white organic EL elements that have substantially the same light amount of emission are arranged, and color filters of the respective colors R, G, and B for optimizing the exposure amounts with respect to each color by adjusting transmittance has been proposed (for example, see Japanese Patent Laid-Open (JP-A) No. 2000-103114, Paragraph 0026). This method is based on the concept that white organic EL elements constituted by the same material have the same degradation rate and degradation amount.

Here, the relationship between emission spectral intensity of an organic EL element and spectral sensitivity of a photosensitive material is discussed. FIG. 13A shows emission spectral intensity of a white organic EL element, FIG. 13B shows spectral transmittance of a color filter, and FIG. 13C shows exposure spectral intensity for exposing the photosensitive material to light. Further, FIG. 13D shows spectral sensitivity of a silver halide photosensitive material (negative type) for general photographs, and FIG. 13E shows color optical density of the photosensitive material.

The color optical densities (Dr, Dg, Db) of the photosensitive material in the respective colors shown in FIG. 13E are derived by multiplying "exposure spectral intensity" shown in FIG. 13C and "spectral sensitivity of photosensitive material" shown in FIG. 13D and integrating with respect to wavelength, as expressed by the following equation.

densities of respective colors (Dr, Dg, Db)=∫(exposure spectral intensity×spectral sensitivity of photosensitive material)$d\lambda$ In addition, the exposure spectral intensity shown in FIG. 13C is a product of "emission spectral intensity" shown in FIG. 13A and "spectral transmittance of filter" shown in FIG. 13B. Therefore, the respective color optical densities of the photosensitive material are expressed by the following equation.

densities of respective colors (Dr, Dg, Db)=∫(emission spectral intensity×spectral transmittance of filter×spectral sensitivity of photosensitive material)$d\lambda$ However, as seen from FIGS. 13A to 13E, the silver halide photosensitive material for general photographs has sensitivity to R, G, and B light as R:G:B≈1:10:70, and the sensitivity ratio greatly differs. Therefore, in the case where the exposure amount is optimized with respect to each of the colors R, G, and B by adjusting transmittance by color filters, there is no choice but to match the amount of light to that of R color of the lowest sensitivity. Therefore, in the case where the method disclosed in Japanese Patent Laid-Open (JP-A) No. 2000-103114, Paragraph 0026 is applied to the photosensitive material having an extreme variance in sensitivity ratio between R, G, and B such as the photosensitive material for general photographs, energy utilization efficiency becomes extremely low.

Further, even if the same types of organic EL elements are used, in the case where the multiple exposure sequence, in which multiple tone exposure is carried out by exposing the same pixel to light a number of times, is performed, a difference is caused in at least one of the luminous intensity and the emission time among the elements that constitute the organic EL element array. If the luminous intensity is the same, but the emission time is different, the cumulative emission amounts of the respective elements become different, and thereby, a difference in the degradation amount is caused. As a result, there is a problem that the luminous intensity varies among the elements that constitute the organic EL element array to generate streaks and deteriorate color balance, as shown in FIG. 14. Especially, in the case where the same image is exposed to light a number of times, the emission amounts of the organic EL elements in certain positions become larger and a significant difference in degradation amount is caused among elements.

On the other hand, in order to deal with the above described problems, it is conceivable that the above described luminous intensities may be made constant by correcting light amounts of the individual organic EL elements. However, there is a problem that a complex apparatus is required in order to measure and correct the light amounts of several thousands to several millions of organic EL elements one by one, and the cost of the apparatus increases proportionately. Further, there is another problem that the time required for correction becomes longer and the productivity becomes lower.

Thus, there is a need in the art to solve the above described problems, and an object of the invention is to provide an exposure apparatus capable of suppressing the deviation of the color balance by a simple construction. In addition, another object of the invention is to provide an exposure apparatus capable of implementing exposure with high energy utilization efficiency.

SUMMARY OF THE INVENTION

In order to achieve the above described objects, an exposure apparatus of the present invention includes: a light emitting element array in which plural types of light emitting elements having different emission spectrums are arranged; a control unit for generating control signals for causing the plural types of light emitting elements to emit light respectively in predetermined luminous intensities according to the types so that degradation rates may be substantially equal among the plural types of light emitting elements; and a drive unit for independently driving the plural types of light emitting elements, respectively, based on the control signals generated in the control unit.

The exposure apparatus of the invention includes a light emitting element array in which plural types of light emitting elements having different emission spectrums are arranged. The control unit generates control signals for causing the plural types of light emitting elements to emit light respectively in predetermined luminous intensities according to the types so that degradation rates may be substantially equal among the plural types of light emitting elements of the light emitting element array. The drive unit independently drives the plural types of light emitting elements, respectively, based on the control signals generated in the control unit.

In the exposure apparatus of the invention, since the degradation rates are uniformized among all of the light emitting elements that constitute the light emitting element array by such simple construction, the deviation of the color balance is suppressed. Further, in the case where the cumulative emission times are made equal, the degradation amounts are uniformized among all of the light emitting elements that constitute the light emitting element array, occurrence of streaks due to sub scanning is suppressed.

Furthermore, when the photosensitive material is exposed, if the light emitting element array in which light emitting elements having the same emission spectrum are arranged is used, all of the light emitting elements should be allowed to emit light in the same luminous intensity according to the color of the lowest spectrum sensitivity of the photosensitive material to be exposed, and thereby, the energy utilization efficiency becomes low. On the other hand, in the case where the photosensitive material is exposed by using the light emitting element array in which plural types of light emitting elements having different emission spectrums, the energy utilization efficiency is improved as compared to the first case.

In the case where the photosensitive material is exposed to light by using the above described exposure apparatus, it is preferred that a filter having transmittance adjusted so that exposure intensity according to spectral sensitivity of the photosensitive material may be obtained is disposed between the light emitting element array and the photosensitive material to be exposed. A good exposure image can be obtained by obtaining exposure intensity according to the spectral sensitivity of the photosensitive material by using the filter.

In addition, as another method for obtaining exposure intensity according to the spectral sensitivity of the photosensitive material, there is a method, by using an exposure apparatus comprising a light emitting element array including plural types of light emitting elements having different emission spectrums, the light emitting element array configured such that plural element rows having plural light emitting elements arranged along a main scanning direction are arranged along a sub scanning direction that intersects with the main scanning direction so that the number of light emitting elements according to spectral sensitivity of the photosensitive material to be exposed and luminous intensities of the light emitting elements may be aligned along the sub scanning direction, for causing the plural types of light emitting elements to emit light respectively in predetermined luminous intensities according to the types so that degradation rates may be substantially equal among the plural types of light emitting elements having different emission spectrums, and for causing the plural types of light emitting elements to emit light respectively so that the same position of the photosensitive material may be subjected to multiple exposure by the plural light emitting elements aligned along the sub scanning direction.

Further, in the control unit of the above described exposure apparatus, by computing cumulative emission amounts with respect to each of the plural types of light emitting elements, and at the time of exposure, generating control signals for causing the plural types of light emitting elements to emit light according to image data, and, after exposure is finished, in order to make the cumulative emission amount of a light emitting element having the maximum cumulative emission amount and the cumulative emission amounts of other light emitting elements equal with respect to all of the light emitting elements, generating control signals for causing at least the other light emitting elements to emit light, the cumulative emission amounts with respect to all of the light emitting elements can be made equal.

Furthermore, this exposure apparatus may further include a light amount detecting unit for detecting exposure light amounts of the plural types of light emitting elements and a control unit for generating control signals for maintaining the exposure light amounts of the plural types of light emitting elements at predetermined values. The respective light emitting elements are degraded with use of the exposure apparatus, and the light amounts (luminous intensities) thereof are gradually reduced. Therefore, the light amounts are corrected before the reduction of the light amounts comes to affect images.

Moreover, the plural types of light emitting elements may be three types of light emitting elements having emission spectrums that make it possible to form a full color image in relation to the photosensitive material. For example, three types of light emitting elements of red light emitting elements that emit red light, green light emitting elements that emit green light, and blue light emitting elements that emit blue light can be used. Thereby, a full color image (latent image) can be formed.

As the light emitting elements used in the exposure apparatus of the invention, organic EL elements that are easily arrayed are preferable. A number of organic EL elements are easily formed on a single substrate by using coating and inkjet methods other than vacuum deposition. In the case where the organic EL elements are used as the light emitting elements in the above described exposure apparatus, there are advantages that, as well as the productivity of the exposure apparatus can be improved, the labor of adjusting arrangement positions of the individual light emitting elements is saved, and the arrangement positions can be maintained with high accuracy.

Note that the exposure apparatus of the invention can be suitably used when the silver halide color photosensitive material is exposed to light. In the case where the silver halide color photosensitive material having low exposure sensitivity of R color is exposed to light, the light emitting elements that emit light in R color become easily degraded, however, by using the exposure apparatus of the invention, the degradation amounts are uniformized among light emitting elements of the respective colors R, G, and B, the streaks of the image are reduced, and thereby, high quality images can be obtained.

BRIEF DESCRIPTION OF THE DRAWINGS

FIG. 10 is a plan view showing an arrangement of light emitting portions (organic EL elements) of an organic EL array of the exposure apparatus according to the second embodiment.

DETAILED DESCRIPTION OF THE INVENTION

Figure 1:
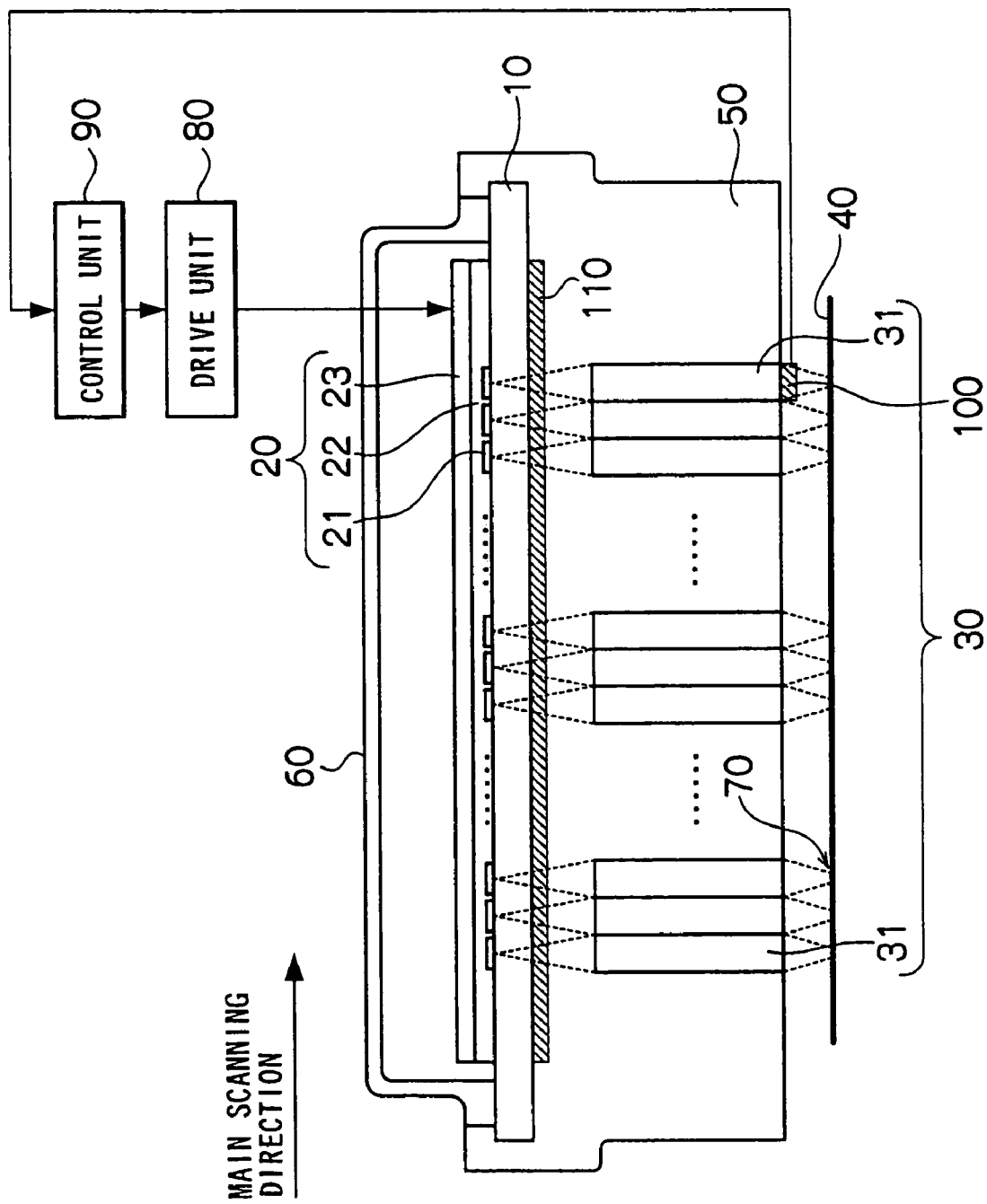
FIG. 1 is a sectional view showing a construction of an exposure apparatus according to a first embodiment.

Hereinafter, the embodiments of the present invention will be described in detail by referring to the drawings.

(First Embodiment)

[Construction of Exposure Apparatus]

An exposure apparatus according to an embodiment of the invention comprises a transparent substrate 10, an organic EL array 20 having plural light emitting portions formed on the transparent substrate 10 and emitting light in any color of R, G, and B colors (hereinafter, the respective light emitting portions are referred to as "organic EL elements" for convenience), a filter 110 for selectively transmitting the light from the respective organic EL elements of the organic EL array 20, a Selfoc lens array 30 (hereinafter, referred to as "SLA"; trade name) for concentrating the light transmitted through the filter 110 and irradiating the photosensitive material 40, and a supporting body 50 for supporting the transparent substrate 10 and the SLA 30, as shown in FIG. 1.

The organic EL array 20 is formed by sequentially laminating a transparent electrode 21 as an anode, an organic compound layer 22 including a light emitting layer, and a metal electrode 23 as a cathode on the transparent substrate 10. The transparent electrode 21 and the metal electrode 23 are patterned in the form of lines so that the lines of the transparent electrode 21 (anode lines) and the lines of the metal electrode 23 (cathode lines) may intersect with each other according to the arrangement layout of the organic EL elements, respectively.

This organic EL array 20 is covered by a sealing member 60 such as a stainless can, for example, and sealed within the sealing member 60 substituted by dry nitrogen gas with the edge of the sealing member 60 and the transparent substrate 10 bonded with an adhesive agent. When predetermined current is injected between the transparent electrode 21 and the metal electrode 23 of this organic EL array 20, the light emitting layer included in the organic compound layer 22 located at the intersection of the anode line and the cathode line emits light, and the emitted light is extracted via the transparent electrode 21 and the transparent substrate 10.

The filter 110 is constituted by three types of color filters of an R color filter 110R for transmitting R color light, a G color filter 110G for transmitting G color light, and a B color filter 110B for transmitting B color light. The respective color filters are formed on a surface (rear surface) of the transparent substrate 10, opposite to a surface on which the organic EL array 20 is formed. The arrangement of the color filters will be described later.

Further, both electrodes of the transparent electrode 21 and the metal electrode 23 are connected to a drive unit 80 for independently driving (passive matrix drive) each of the plural organic EL elements. This drive unit 80 is constituted by including a power supply (not shown) for applying a voltage between both of the electrodes, and a switching element (not shown) constituted by a transistor and a thyristor. Note that the passive matrix drive is a drive system for performing time-sharing line-sequential scanning on the respective cathode lines, driving the anode lines intersecting the cathode lines being scanned in response to the signals for emission, and running the scanning across all of the cathode lines sequentially.

The above described drive unit 80 is connected to a control unit 90 including a CPU, a ROM in which various processing routines described later are stored, a RAM, and a data input/output unit. In this control unit 90, control signals for driving and controlling the respective organic EL elements are generated, and the drive unit 80 modulates and drives the respective organic EL elements based on the control signals from the control unit 90.

The modulation method may be any of pulse width modulation with constant current, pulse width modulation with constant voltage, pulse number modulation with constant current or constant voltage, and intensity modulation. Alternatively, plural modulation methods can be simultaneously used. In addition, the organic EL element is basically a current drive element, and thereby, its temperature characteristics and time-varying driving characteristics become more stable by current drive modulation for modulating and driving it by varying drive current than by voltage drive modulation for modulating and driving it by varying drive voltage. Therefore, the current drive modulation is more preferable.

A photodetector 100 for detecting light intensity transmitted through the SLA 30 is provided on the light exit side of the SLA 30 so as to correspond to one element of the organic EL array 20. The light intensity measured in this position corresponds to the intensity of light to which the photosensitive material is exposed. The photodetector 100 is connected to the control unit 90, and the detection value detected by the photodetector 100 is fed back to the control unit 90.

Note that, the photodetector 100 is preferably disposed so as not to prevent exposure. For example, a dummy element unused for exposure can be disposed within the organic EL array 20, and the photodetector 100 can be disposed in the exposure optical path of this dummy element. Alternatively, the apparatus may have a construction in which the photodetector 100 is movable, and the photodetector 100 can be inserted in the exposure optical path of the organic El elements only at the time of non-exposure.

The transparent substrate 10 is a transparent substrate to the emitted light, and a glass substrate, a plastic substrate, and the like can be used. In addition, as general substrate properties, heat resistance, dimensional stability, solvent resistance, electric insulation, workability, low permeability, low hygroscopicity, etc. are required for the transparent substrate 10.

It is preferred that the transparent electrode (anode) 21 has optical transmittance at least 50% or more, more preferably 70% or more, in an wavelength region of visible light from 400 nm to 700 nm. As a material for constituting the transparent electrode 21, compound such as tin oxide, indium tin oxide (ITO), and indium zinc oxide, which are known as the materials for a transparent substrate may be used, and other than the foregoing, a thin film of metal having a large work function such as gold and platinum may also be used. Further, organic compound such as polyaniline, polythiophene, polypyrrole, or derivatives thereof may be used. The transparent conductive film is described in detail in "Developments of Transparent Conductive Films" under the general editorship of Yutaka Sawada, CMC Publishing, Co., Ltd. (1999), and can be applied the invention.

Furthermore, the transparent electrode 21 can be formed on the transparent substrate 10 by vacuum deposition, sputtering, ion plating methods, and the like.

The organic compound layer 22 may have a single layer structure constituted only by the light emitting layer, or may have a laminated layer structure appropriately having layers such as a hole injection layer, a hole transport layer, an electron injection layer and an electron transport layer other than the light emitting layer. As a specific construction of the organic compound layer 22 (represented by including electrodes), anode/hole injection layer/hole transport layer/light emitting layer/electron transport layer/cathode, anode/light emitting layer/electron transport layer/cathode, and anode/hole transport layer/light emitting layer/electron transport layer/cathode can be cited. Alternatively, plural light emitting layers, hole transport layers, hole injection layers, and electron injection layers may be provided.

The organic EL array 20 emits light in colors corresponding to the materials of the organic compound layer. Therefore, by applying different materials of the organic compound layer to the elements, respectively, the organic EL array 20 having plural organic EL elements that emit any color of R, G, and B colors can be obtained. In the respective constitutive layers of the organic compound layer such as a hole transport layer, an electron transport layer, a light emitting layer, and a conductive polymeric layer, conventionally known materials can be appropriately used. In addition, the respective constitutive layers can be formed by using known methods such as vacuum deposition, sputtering, dipping, spin coating, casting, bar coating, roll coating methods. Alternatively, multilayer coating can be performed by using different solvents appropriately.

It is preferred that the metal electrode (cathode) 23 is formed of metal materials of alkali metal such as Li and K of low work function, alkali earth metal such as Mg and Ca, and alloy and mixture of these metals and Ag, Al, etc. For compatibility between storage stability and electron injection in the cathode, the electrode formed of the above described materials may be further covered by Ag, Al, Au, etc. of large work function with high conductivity. Note that, the metal electrode 23 can be formed by the known method such as vacuum deposition, sputtering, and ion plating methods, as well as the transparent electrode 21. Further, the metal electrode 23 can be constituted by the transparent conductive film as well as the transparent electrode 21.

The SLA 30 is constituted by plural Selfoc lenses 31. The Selfoc lens 31 is a thick lens in the form of bar having refractive index distribution in a radial direction of the section. The light entered into the Selfoc lens 31 travels while winding along a sine wave relative to the optical axis, and is output toward the photosensitive material 40 so as to form an image on the surface of the photosensitive material 40 to form an exposure spot 70.

Further, in order to narrow the exposure spot and suppress optical crosstalk, an opening of this Selfoc lens 31 is formed larger than the respective light emitting areas of the respective organic EL arrays 20, and the adjacent Selfoc lenses 31 are arranged so as to contact with each other. Note that, the Selfoc lenses 31 may be provided so as to correspond to the respective organic EL elements of the organic EL array 20 in one-to-one relation, or one Selfoc lens 31 may be provided so as to correspond to plural organic EL elements arranged along the sub scanning direction in one-to-N (N: integer of 2 or more).

The photosensitive material 40 is not limited if only color exposure can be performed in three colors R, G, and B. For example, a color silver halide photosensitive material can be used as the photosensitive material 40. In addition, a photosensitive and heat-sensitive material can be used. Note that, the photosensitive material 40 is fed in a direction intersecting the main scanning direction of the exposure apparatus by a feeding apparatus, which is not shown.

[Arrangement of Light Emitting Elements and Luminous Intensity]

Next, the arrangement of the organic EL elements of the organic EL array 20 will be described. In the organic EL array 20, as shown in FIG. 2, organic EL elements 25R emitting red (R color) light, organic EL elements 25G emitting green (G color) light, and organic EL elements 25B emitting blue (B color) light are arranged in a staggered pattern on the same substrate according to layout described as below.

First, the element row R is constructed by arranging the plural organic EL elements 25R at a predetermined distance from each other along the main scanning direction, and plural element rows R are arranged along the sub scanning direction. Similarly, the element rows G, in which plural organic EL elements 25G are arranged, are arranged along the sub scanning direction, the number of the element rows G being the same as the number of the element rows R. The element rows B, in which plural organic EL elements 25B are arranged, are arranged along the sub scanning direction, the number of the element rows B being the same as the number of the element rows R. Further, the element rows adjacent to each other among the plural element rows are positioned so as to be displaced by a predetermined distance in the main scanning direction. Thereby, an area between the exposure spots formed by organic EL elements of a certain element row can be exposed to light by organic EL elements of adjacent element row to this element row.

Figure 2:
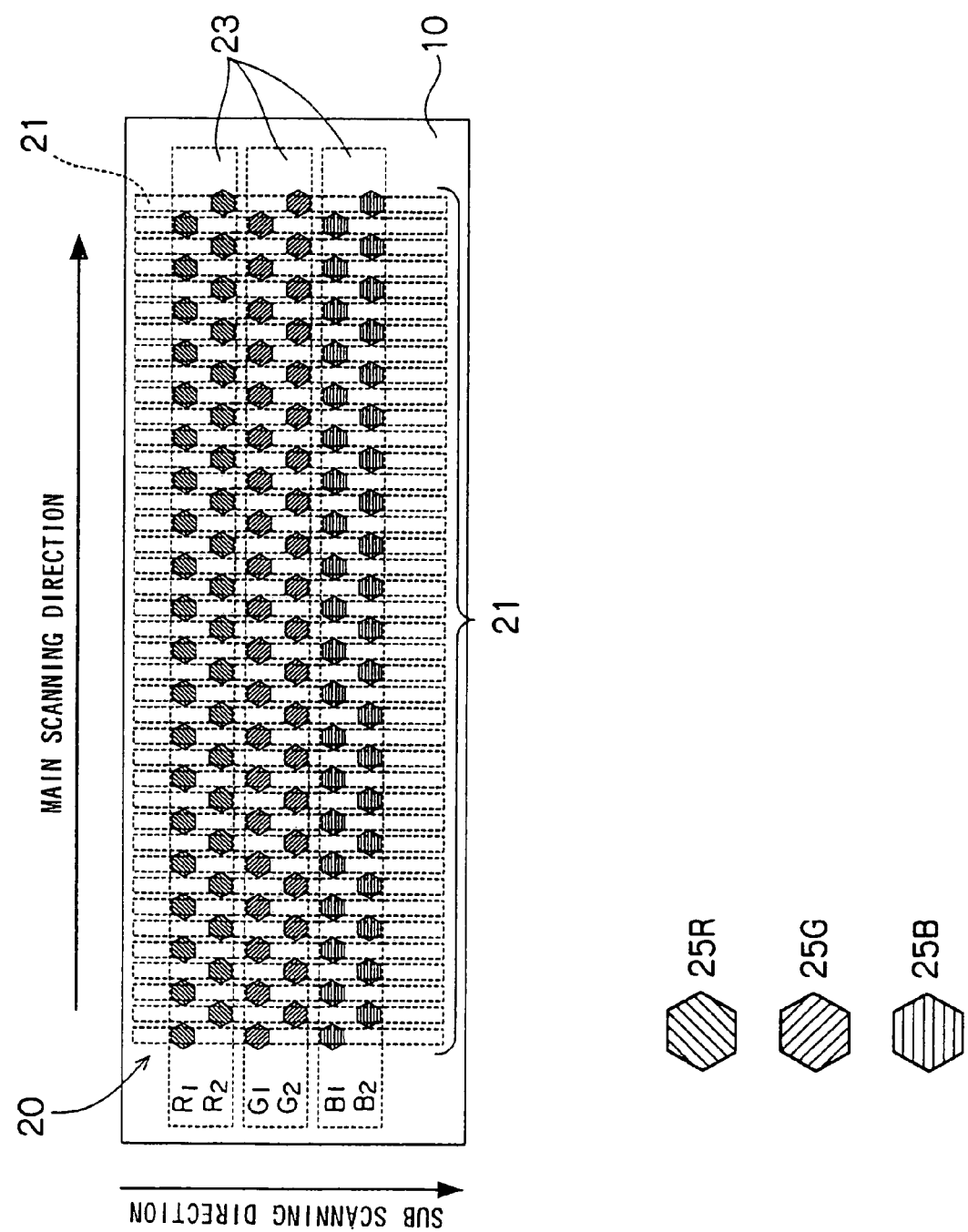
FIG. 2 is a plan view showing an arrangement of light emitting portions (organic EL elements) of an organic EL array of the exposure apparatus according to the first embodiment.

For example, in FIG. 2, two element rows $R_1$ and $R_2$ in which twenty organic EL elements 25R are respectively arranged along the main scanning direction, two element rows $G_1$ and $G_2$ in which twenty organic EL elements 25G are respectively arranged along the main scanning direction, and two element rows $B_1$ and $B_2$ in which twenty organic EL elements 25B are respectively arranged along the main scanning direction are arranged along the sub scanning direction in a sequence of R, G, and B. Further, the mutually adjacent element rows $R_1$ and $R_2$, element rows $G_1$ and $G_2$, and element rows $B_1$ and $B_2$ are arranged so as to be displaced by a predetermined distance along the main scanning direction, and respective ones of organic EL elements for the respective three colors R, G, and B, three organic EL elements in total are arranged along the sub scanning direction.

Figure 3:
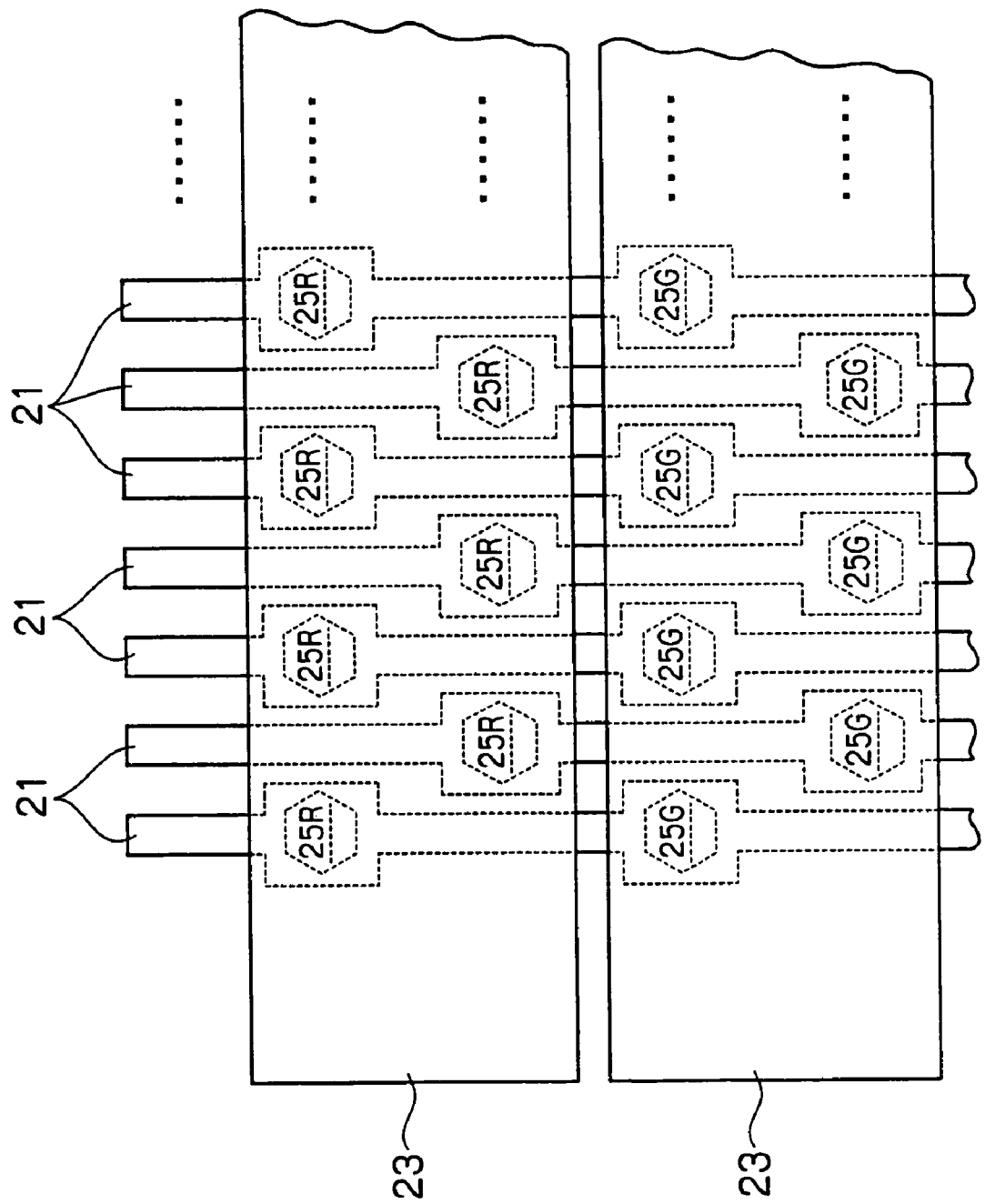
FIG. 3 is a partially enlarged view of the organic EL array shown in FIG. 2.

The form of each light emitting portion is substantially hexagon, and the adjacent rows of the same color elements (for example, the element row $R_1$ and the element row $R_2$) are formed on one cathode line (the line of the metal electrode 23), as shown in FIGS. 2 and 3. That is, a set of two element rows is formed on one cathode line and driven by the one cathode line. Thereby, compared to the case where one cathode line is assigned with respect to each row, the number of the cathode lines can be reduced to half and a drive circuit and a control circuit therefor can be simplified.

Furthermore, when emitted in the same luminous intensity, the organic EL element 25R, the organic EL element 25G, and the organic EL element 25B are different in degradation rate (degradation amount per unit time) from each other, however, different luminous intensities are set in the respective organic EL element 25R, organic EL element 25G, and organic EL element 25B so that the degradation rates among three colors R, G, and B may be substantially the same. Thus, by allowing the organic EL elements of the respective colors R, G, and B to emit in different luminous intensities, the energy utilization efficiency becomes higher as compared to the case where the white organic EL elements are allowed to emit light in the luminous intensity by which desired color optical density is obtained in R color of the lowest sensitivity.

[Arrangement and Transmittance of Color Filters]

Figure 4:
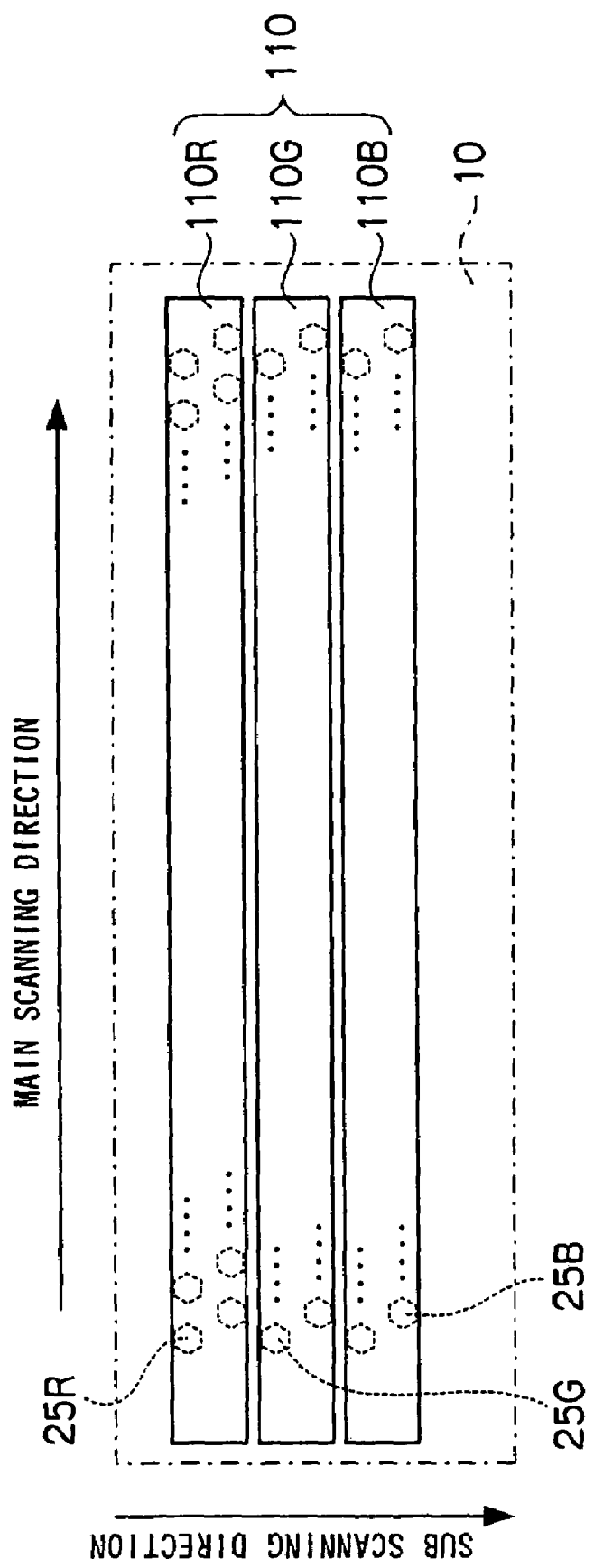
FIG. 4 is a plan view seen from a front surface of a transparent substrate and showing an arrangement of color filters of the exposure apparatus according to the first embodiment.

On the rear surface of the transparent substrate 10, as shown in FIG. 4, the R color filter 110R, G color filter 110G, and B color filter 110B in the form of belt, respectively, are disposed so as to correspond to the organic EL element for the respective colors R, G, and B, so that the longitudinal directions thereof may be directed in the element aligning direction, and may intersect the optical paths of the organic EL elements of the colors corresponding thereto.

The transmittances of the respective color filters to the light of the respective colors are set with respect to each color so that color optical densities of the respective colors R, G, and B of the photosensitive material maybe equal. As described by referring to FIG. 13, the color optical densities of the respective colors of the photosensitive material can be obtained by integrating with respect to wavelength, the product of emission spectral intensity, spectral transmittance of filter, and spectral sensitivity of the photosensitive material. Further, as described above, different luminous intensities are set with respect to the organic EL element 25R, organic EL element 25G, and organic EL element 25B, respectively. Therefore, the transmittances of the respective color filters are set with respect to the colors R, G, and B according to the color optical densities of the respective colors of the photosensitive material, emission spectral intensity, and spectral sensitivity of the photosensitive material.

Figure 5A:
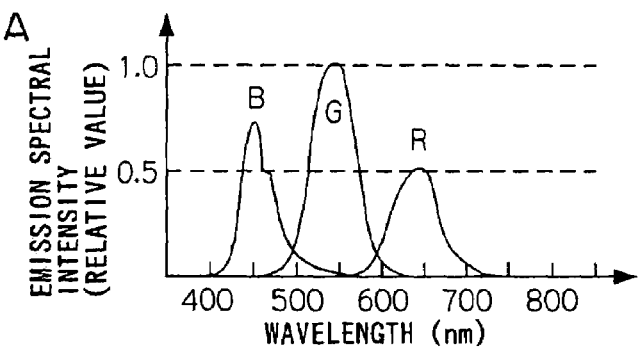
FIG. 5A is a graph showing emission spectral intensity.
Figure 5B:
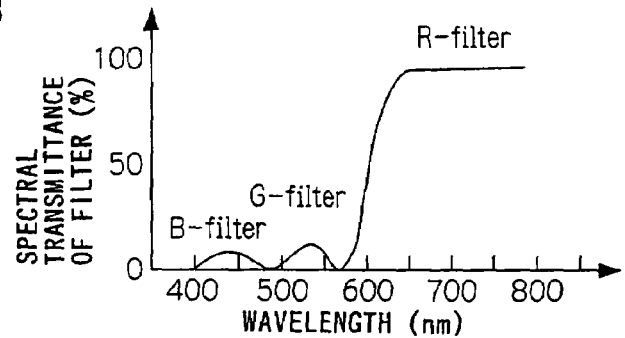
FIG. 5B is a graph showing spectral transmittance of a filter.
Figure 5C:
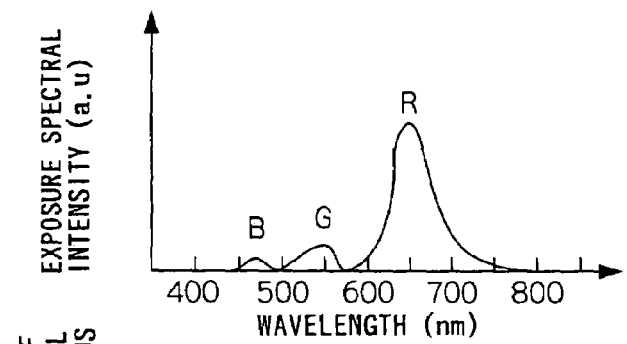
FIG. 5C is a graph showing exposure spectral intensity.
Figure 5D:
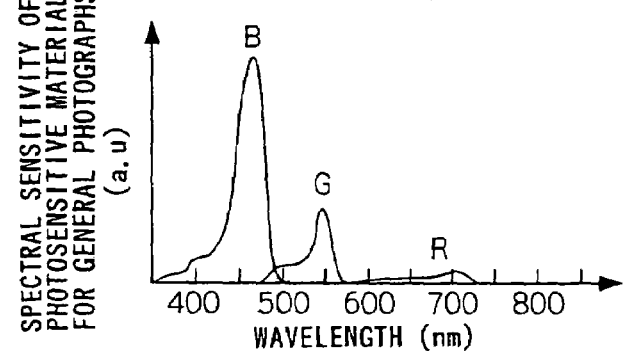
FIG. 5D is a graph showing spectral sensitivity of a photosensitive material.
Figure 5E:
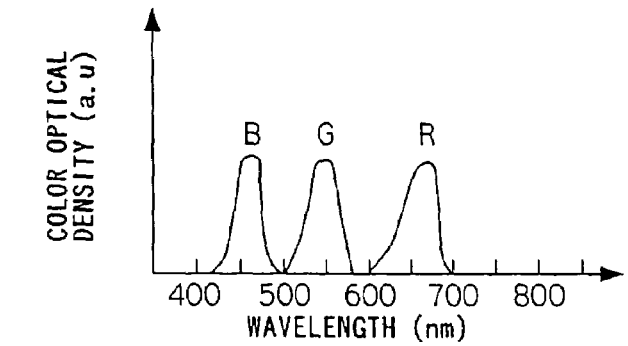
FIG. 5E is a graph showing color optical density of the photosensitive material.

For example, when trying to obtain the substantially the same color optical densities in the respective colors R, G, and B as shown in FIG. 5E, by exposing the silver halide photosensitive material (negative type) for general photographs, which has spectral sensitivity shown in FIG. 5D, it is necessary to expose the photosensitive material to exposure light having spectral intensity shown in FIG. 5C. Note that, the spectral sensitivity of the silver halide photosensitive material for general photographs is $R:G:B \approx 1:10:70$.

The luminous intensities of the organic EL element 25R, organic EL element 25G, and organic EL element 25B are set so that the ratio of luminous intensities may be $R:G:B \approx 0.5:1:0.7$ as shown in FIG. 5A in order to make the degradation rates of the respective colors R, G, and B equal to each other. Therefore, in order to obtain the exposure spectral intensity shown in FIG. 5C, color filters of three colors R, G, and B having predetermined transmittances as shown in FIG. 5B should be prepared.

[Exposure Processing based on Image Data]

Next, exposure operation when a photosensitive material is exposed to light by using the above described exposure apparatus will be described. Note that, as below, the case where a photosensitive material is exposed to light by modulating and driving the respective organic EL elements by the pulse width modulation (PWM) of constant current drive will be described. In the pulse width modulation, the luminous intensities of the respective elements are fixed and the emission times thereof are varied.

Figure 6:
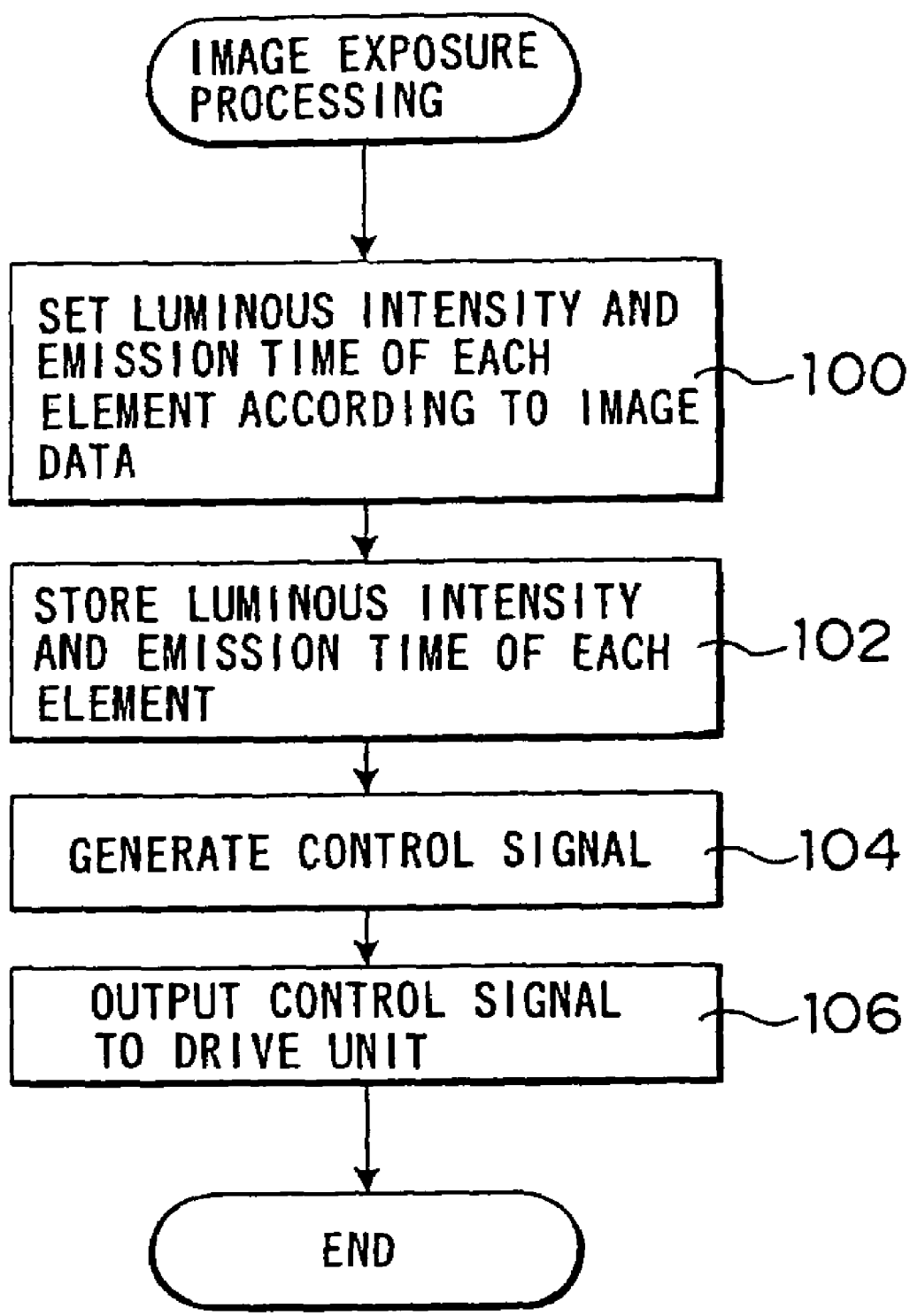
FIG. 6 is a flowchart showing an exposure processing routine.

First, when the exposure processing is performed, the exposure processing routine stored in the ROM is read out and executed. By referring to FIG. 6, the exposure processing routine executed in the control unit 90 will be described.

When the image data is inputted to the control unit 90, in Step 100, the luminous intensities and the emission times of the respective organic EL elements of the organic EL array 20 are set according to the inputted image data. In Step 102, the set values of the luminous intensities and the emission times are stored in the RAM. As described above, different luminous intensities are set for the organic EL elements 25R, the organic EL elements 25G, and the organic EL elements 25B, respectively, so that their degradation rates may become substantially the same among three colors R, G, and B.

Note that the values of drive current of the organic EL elements have been stored for respective colors R, G, and B in the RAM in advance. Alternatively, the organic EL elements of the respective colors R, G, and B are driven with constant current at their initial states, and the intensities of light (transmitted light intensities) of the respective colors, which has been passed through the SLA 30, are detected. In the case where transmitted light intensities vary among the sets of elements of the respective colors R, G, and B, correction coefficients may be set for correcting the pulse width with respect to each element. In the case where the correction coefficients are set, the luminous intensities and the emission times are set in consideration of the correction coefficients.

Next, in Step 104, the control signals are generated based on the set values of the luminous intensities and the emission times, and, in Step 106, the generated control signals are outputted to the drive unit 80.

As the photosensitive material 40 is carried, the organic EL elements 25R, 25G, and 25B of the organic EL array 20 are lighted at predetermined timings based on the control signals by the drive unit 80, respectively, and the same position of the photosensitive material 40 is exposed to light (multiple exposure) by the organic EL elements of the three colors R, G, and B, which are arranged along the sub scanning direction. For example, in the arrangement of elements shown in FIG. 2, the multiple exposure of three times in total is performed once by the organic EL element 25R emitting light in red, once by the organic EL element 25G emitting light in green, and once by the organic EL element 25B emitting light in blue.

[Degradation Amount Uniformizing Processing]

When the exposure of the image data for one sheet is finished, degradation amount uniformizing processing is performed for uniformizing the degradation amount of the respective organic EL elements before starting exposure of the next image data. The degradation amount uniformizing processing is processing to allow the respective organic EL elements to perform dummy emission so that the cumulative emission amounts of the respective organic EL elements may be equal.

Figure 7:
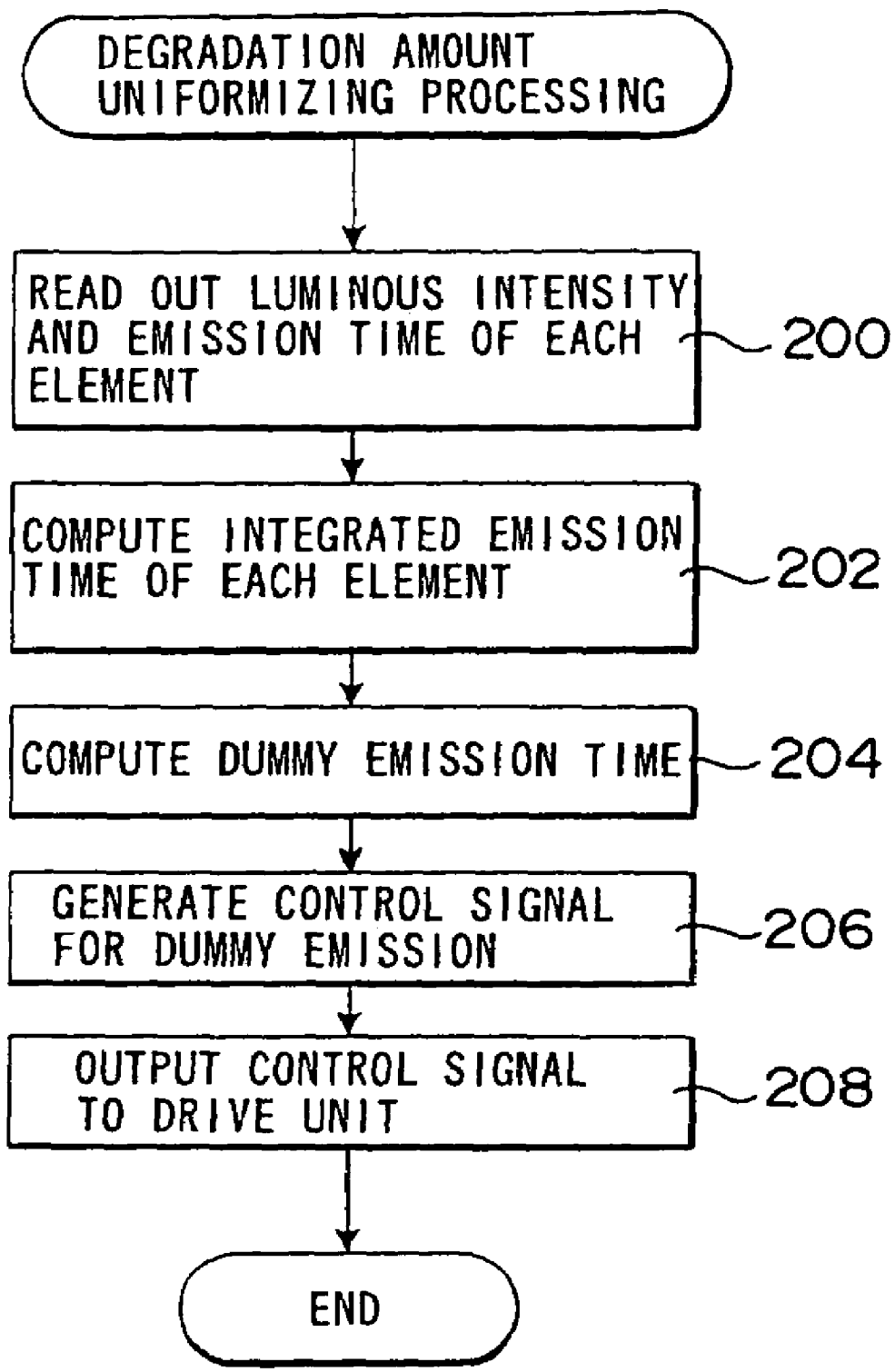
FIG. 7 is a flowchart showing a degradation amount uniformizing processing routine.

When the degradation amount uniformizing processing is performed, a degradation amount uniformizing processing routine stored in the ROM is read out and executed. The degradation amount uniformizing processing routine executed in the control unit 90 will be described by referring to FIG. 7.

In Step 200, the values of the luminous intensities and the emission times stored in the RAM are read out with respect to the image data for one sheet, and, in Step 202, accumulated emission time $T_j$ of the respective organic EL elements is calculated. The accumulated emission time is summation of emission times for allowing the organic EL elements to emit light, and the product of this accumulated emission time and the luminous intensity is cumulative emission amount. Note that j indicates a number assigned with respect to each color for identifying the organic EL elements. For example, $T_{20}$ indicates accumulated emission time of 20th organic EL element.

Next, in Step 204, according to the following equation, the dummy emission times $\tau_j$ of the respective organic EL elements are computed. $MAX(j:T_j)$ is the maximum accumulated emission time of the organic EL elements, i.e., the maximum value of the computed accumulated emission time.

$$\tau_j = MAX(j:T_j) - T_j$$

Next, in Step 206, the control signals for dummy emission are generated based on the dummy emission times $\tau_j$ of the respective organic EL elements, and, in Step 208, the generated control signals are outputted to the drive unit 80. The organic EL elements 25R, 25G, and 25B of the organic EL array 20 are lighted based on the control signals by the drive unit 80, respectively.

Figure 14B:
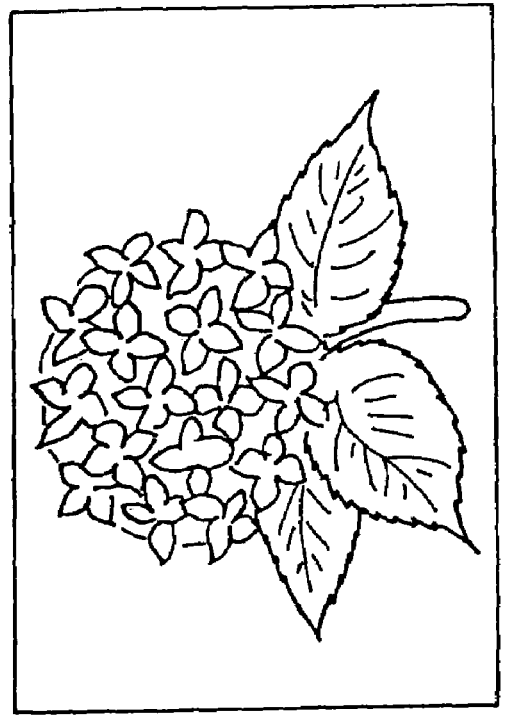
FIG. 14B is an example of an image in the case where the degradation amount uniformizing processing is performed thereon.
Figure 14A:
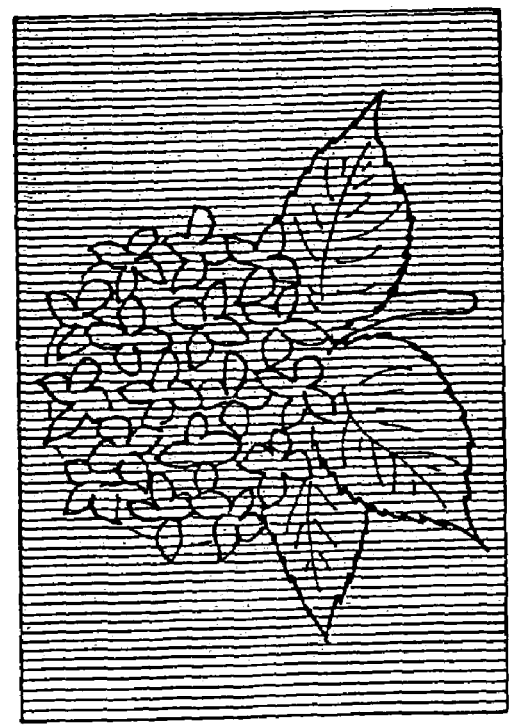
FIG. 14A is an example of an image in the case where the degradation amount uniformizing processing is not performed thereon.

Thus, by performing dummy emission on the respective organic EL elements for the differential time of the maximum accumulated emission time and the accumulated emission time, the accumulated emission time with respect to all of the organic EL elements becomes equal. Further, as described above, since the degradation rates for the respective colors R, G, and B are adjusted to be equal even if construction materials of the organic EL elements for the respective colors R, G, and B are different, if the accumulated emission time is equal, the degradation amounts of all of the organic EL elements become substantially equal. Thereby, occurrence of streaks due to variations of degradation amounts is suppressed, and as shown in FIG. 14B, a good image without streaks along sub scanning direction can be obtained.

As described above, in the exposure apparatus of the embodiment, since the degradation rates of the organic EL elements for the respective colors R, G, and B are substantially equal, images with good color balance can always be obtained. Furthermore, by performing the degradation amount uniformizing processing for the respective organic EL elements to perform dummy emission until reaching the maximum accumulated emission time, after the degradation rates of the organic EL elements for the respective colors R, G, and B are made substantially equal, the accumulated emission times become equal with respect to all of the organic EL elements, and the degradation amounts become substantially equal. Thereby, occurrence of streaks due to variations of degradation amounts in the respective organic EL elements is suppressed.

Further, by allowing the organic EL elements for the respective colors R, G, and B to emit light in different luminous intensities, the energy utilization efficiency becomes higher as compared to the case where white organic EL elements are allowed to emit light in luminous intensity by which desired color optical density is obtained in R color of the lowest sensitivity.

Furthermore, since the exposure spectral intensity is adjusted by the transmittances of the color filters of three colors R, G, and B, the drive control of the organic EL elements becomes simple.

Moreover, as compared to the case where the color balance is corrected by measuring the light amounts of several thousands to several millions of organic EL elements one by one, the color balance can be maintained in a good condition by the simple construction, and thereby, the apparatus cost can be reduced and the productivity can be improved.

(Second Embodiment)

Figure 8:
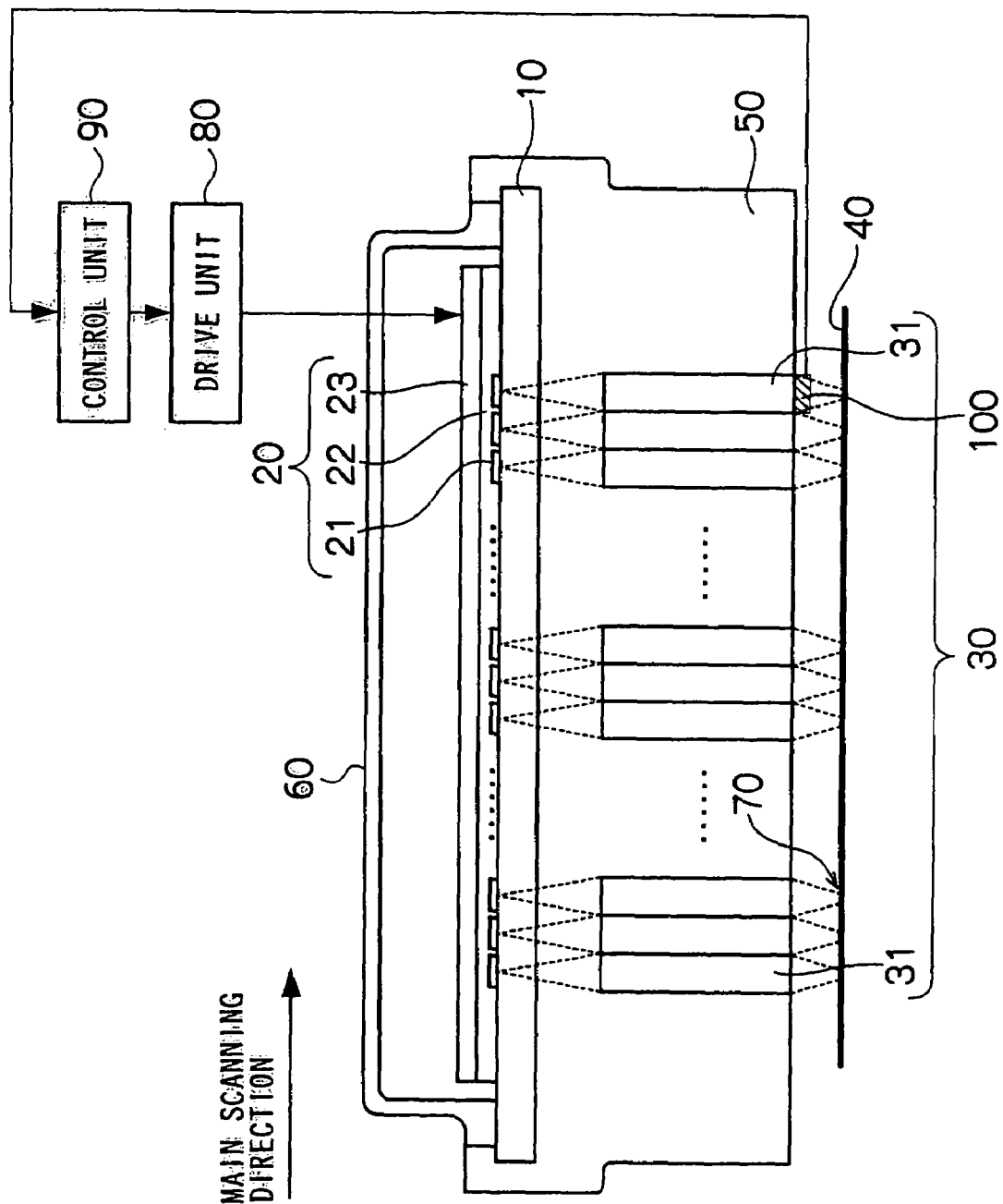
FIG. 8 is a sectional view showing a construction of an exposure apparatus according to a second embodiment.

Since an exposure apparatus according to a second embodiment has the same construction with the exposure apparatus according to the first embodiment, except that the filter is not provided on the rear surface of the transparent substrate 10, as shown in FIG. 8, and the arrangement and the luminous intensity of the organic EL elements are different, the same components are assigned with the same signs and the description thereof will be omitted.

In the first embodiment, different luminous intensities are set for the respective colors so that the degradation rates may be substantially the same among the organic EL elements of three colors R, G, and B, and the transmittances of the respective color filters are adjusted so that the desired exposure spectral intensity may be obtained. However, in the second embodiment, by setting different luminous intensities for the respective colors so that the degradation rates may be substantially the same among organic EL elements for three colors R, G, and B, and performing multiple exposure on the same position of the photosensitive material with respect to each color, the desired exposure spectral intensity can be obtained.

Figure 9A:
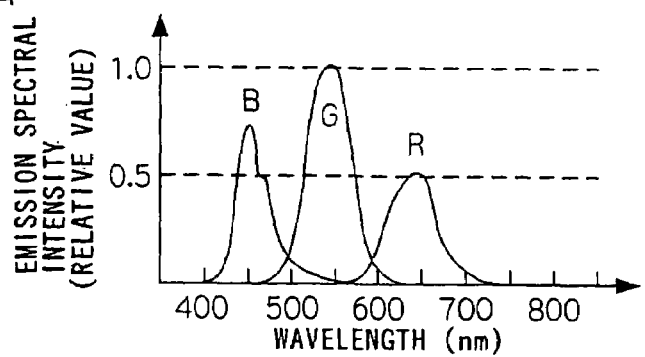
FIG. 9A is a graph showing emission spectral intensity.
Figure 9B:
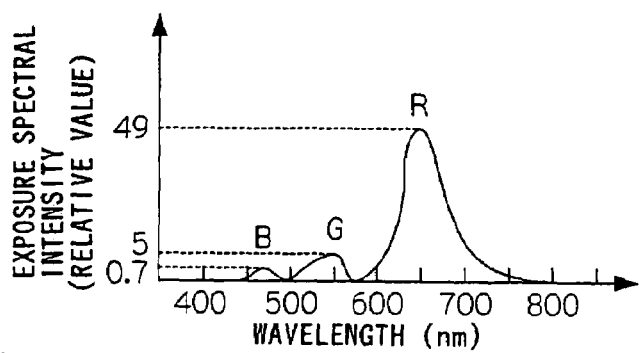
FIG. 9B is a graph showing exposure spectral intensity.
Figure 9C:
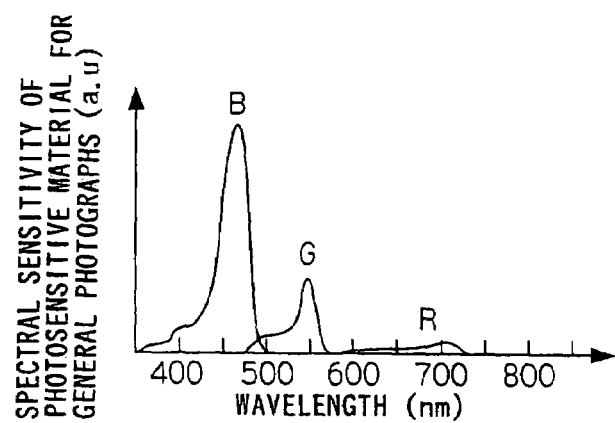
FIG. 9C is a graph showing spectral sensitivity of a photosensitive material.
Figure 9D:
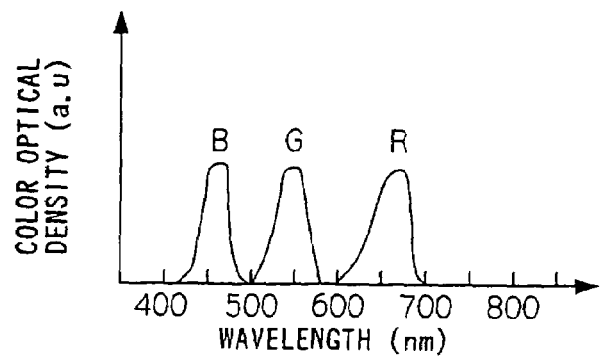
FIG. 9D is a graph showing color optical density of the photosensitive material.

For example, when trying to obtain the substantially the same color optical densities in the respective colors R, G, and B as shown in FIG. 9D, by exposing the silver halide photosensitive material (negative type) for general photographs, which has spectral sensitivity shown in FIG. 9C, it is necessary to expose the photosensitive material to exposure light having spectral intensity shown in FIG. 9B. Note that, the spectral sensitivity of the silver halide photosensitive material for general photographs is R:G:B≈1:10:70, and the spectral intensity ratio of the exposure light is R:G:B≈49:5:0.7.

The luminous intensities of the organic EL element 25R, organic EL element 25G, and organic EL element 25B are set so that the ratio of luminous intensities may be R:G:B≈0.5:1:0.7 as shown in FIG. 9A in order to make the degradation rates of the respective colors R, G, and B equal to each other.

Therefore, in order to obtain the exposure spectral intensity shown in FIG. 9B, the ratio of the number of the multiple exposure for the respective colors R, G, and B should be made as R:G:B≈98:5:1.

On this account, for example, the organic EL array 20 in which the organic EL elements for three colors R, G, and B are arranged according to the layout shown in FIG. 10 may be used. In this layout, the respective organic EL elements are arranged by being divided in an R area 28R in which the R color organic EL elements 25R are arranged, a G area 28G in which the G color organic EL elements 25G are arranged, and a B area 28B in which the B color organic EL elements 25B are arranged. The arrangement of the respective organic EL elements is made as a simple matrix arrangement. Further, on the substrate 10, a cathode drive circuit row IC and an anode drive circuit column IC are disposed so as to surround an area in which the light emitting elements of the respective areas are formed.

For example, by arranging ninety-eight element rows R in which 3,840 of the organic EL elements 25R are arranged in the R area, five element rows G in which 3,840 of the organic EL elements 25G are arranged in the G area, and one element row B in which 3,840 of the organic EL elements 25B are arranged in the B area, the same position of the photosensitive material can be exposed ninety-eight times to R light, five times to G light, and once to B light. Note that, as compared to the case, as in the first embodiment, where the same position is exposed to light once with respect to each of the colors R, G, and B, in the case where the exposure is performed at plural times with respect to each of the colors R, G, and B, the average luminous intensity per element (time average) is reduced inversely proportional to the number of times of the multiple exposure.

The form of each light emitting portion is substantially hexagonal, and, as well as in the first embodiment, the adjacent element rows of the same color are formed on one cathode line. That is, sets of two element rows are formed on one cathode line, and driven by the one cathode line.

As described above, in the exposure apparatus according to the embodiment, since the degradation rates of the organic EL elements for the respective colors of R, G, and B are substantially equal, images with good color balance can always be obtained as in the first embodiment. Especially, in the organic EL array in which the larger number of organic EL elements are arranged, a difference in degradation amounts is caused more easily among elements, and the effect of the degradation rate uniformizing processing and the degradation amount uniformizing processing appear significantly.

In addition, by performing the degradation amount uniformizing processing for the respective organic EL elements to perform dummy emission until reaching the maximum accumulated emission time, after the degradation rates of the organic EL elements for the respective colors R, G, and B are made substantially equal, the accumulated emission times become equal with respect to all of the organic EL element, and the degradation amounts also become substantially equal. Thereby, occurrence of streaks due to variations of degradation amounts is suppressed in the respective organic EL elements.

Further, by allowing the organic EL elements for the respective colors R, G, and B to emit light in different luminous intensities, the energy utilization efficiency becomes higher as compared to the case where white organic EL elements are allowed to emit light in luminous intensity by which desired color optical density is obtained in R color of the lowest sensitivity.

Furthermore, since the exposure spectral intensity is adjusted by the number of times of multiple exposure using organic EL elements for three colors R, G, and B, the exposure spectral intensity can be finely adjusted.

Moreover, in the organic EL array in which the larger number of organic EL elements are arranged, the more the cost is raised and the less the productivity is reduced when amounts of light of the independent organic EL elements are measured and corrected. Therefore, the invention has large advantage in view of cost reduction and improvement in productivity.

Note that in the exposure apparatus according to the second embodiment, the entire of sets of the organic EL elements are passive matrix driven by a drive circuit, which is not shown.

[Modified Example of Embodiments of the Invention]

(Adjustment of Exposure Spectral Intensity)

In order to obtain the desired exposure spectral intensity, the transmittances of the respective color filters are adjusted in the first embodiment, and the same position of the photosensitive material is subjected to multiple exposure with respect to each color in the second embodiment, however, the exposure spectral intensity may be adjusted by simultaneously using both methods.

(Light Emitting Element)

The exposure apparatus including organic EL elements as light emitting elements is described as mentioned above, the invention can be applied to an exposure apparatus including other light emitting elements such as a laser diode (LD), a light emitting diode (LED) and the like.

(Reference Value of Cumulative Emission Amount)

In the above description, in the pulse width modulation drive at constant current (luminous intensity is fixed), with the maximum accumulated emission time as the reference value, the degradation amount uniformizing processing is performed so that the accumulated emission times (summation of pulse widths) may be equal in the respective organic EL elements. However, since the emission amount is obtained as the product of emission time and the luminous intensity, the reference value of the cumulative emission amount can be appropriately selected according to modulation methods etc.

In the case of the pulse number modulation (the luminous intensity is fixed), the maximum accumulated pulse number can be used as the reference value. In this case, the pulse number of dummy emission is calculated as the difference between the maximum accumulated pulse number and the accumulated pulse number (summation of pulse number) with respect to the organic EL elements. In the case of intensity modification (emission time is fixed), the maximum accumulated luminous intensity can be used as the reference value. In this case, the luminous intensity of dummy emission is calculated as the difference between the maximum accumulated luminous intensity and the accumulated luminous intensity (time integrated value of luminous intensity) with respect to the organic EL elements.

Further, the actual cumulative emission amount can be obtained as the product of the emission time and the actually measured luminous intensity, however, the larger value than the actual cumulative emission amount can also be set as the reference value. For example, the luminous intensity in apparatus design is set with respect to each organic EL element for the respective colors R, G, and B, and the product of this set luminous intensity and the emission time can be set as the reference value. Since the luminous intensities of the organic EL elements are lowered according to the used hours, the set value is always equal to or more than the actually measured value. However, it is preferred that the actual cumulative emission amount is used as the reference value in order to perform dummy exposure appropriately.

(Timing of Performing Degradation Amount Uniformizing Processing)

As above, degradation amount uniformizing processing is performed after the exposure of the image data for one sheet is finished by the time for starting the next exposure, however, the timing of performing degradation amount uniformizing processing can be arbitrarily set. For example, at the stage where the exposure of the image data for plural sheets is finished, the degradation amount uniformizing processing may be performed at a time. Alternatively, the processing may be performed simultaneously when the apparatus is activated or calibration mode is executed. Moreover, the processing may be performed at fixed intervals such as once a day or once a week.

(Light Amount Correction Processing)

The respective organic EL elements are degraded as the exposure apparatus is used, and the light amount (luminous intensity) is gradually reduced. Therefore, before the light amount reduction affects images, the light amount correction processing is appropriately performed.

Figure 11:
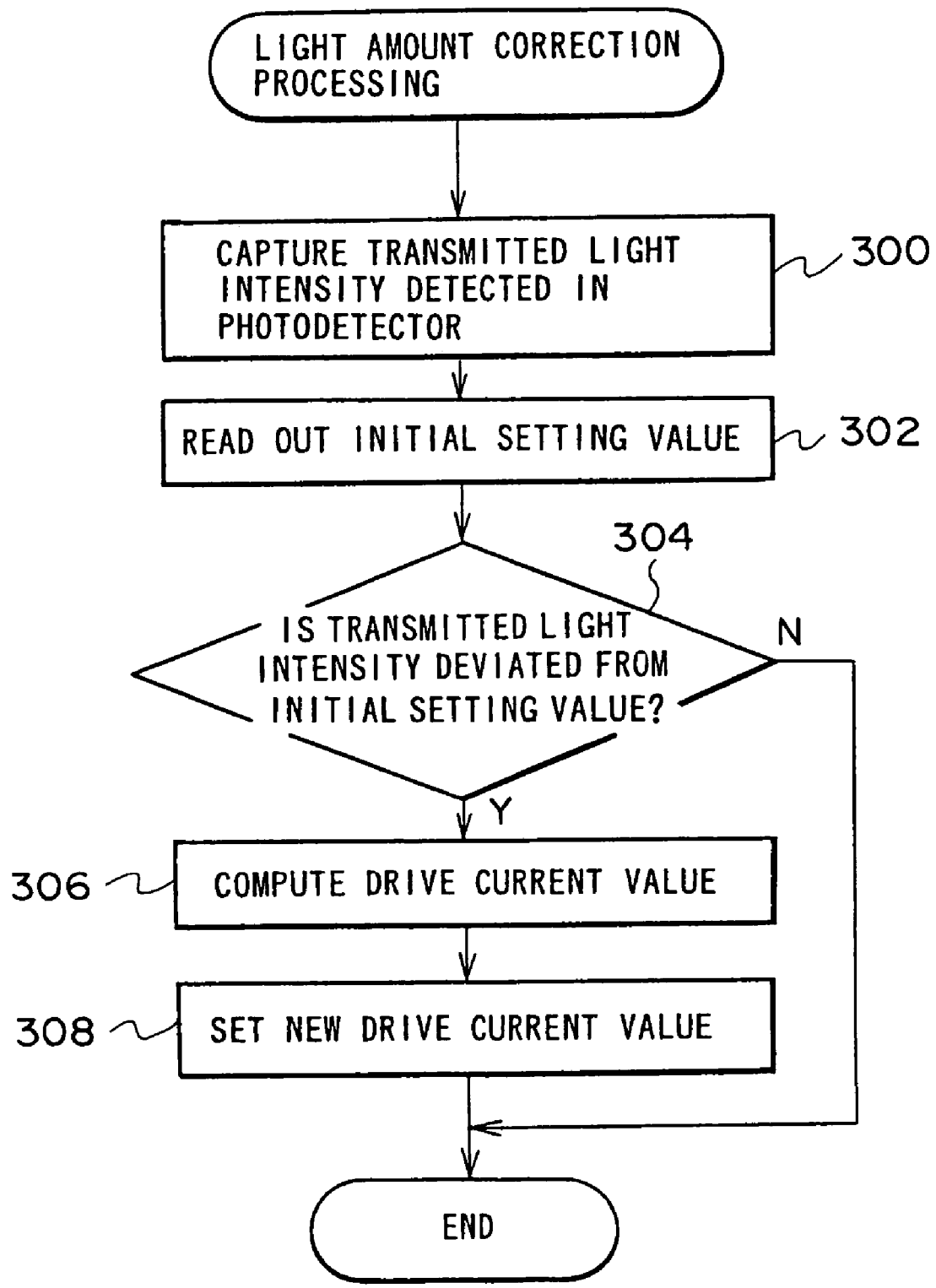
FIG. 11 is a flowchart showing a light amount correction processing routine.
Figure 12:
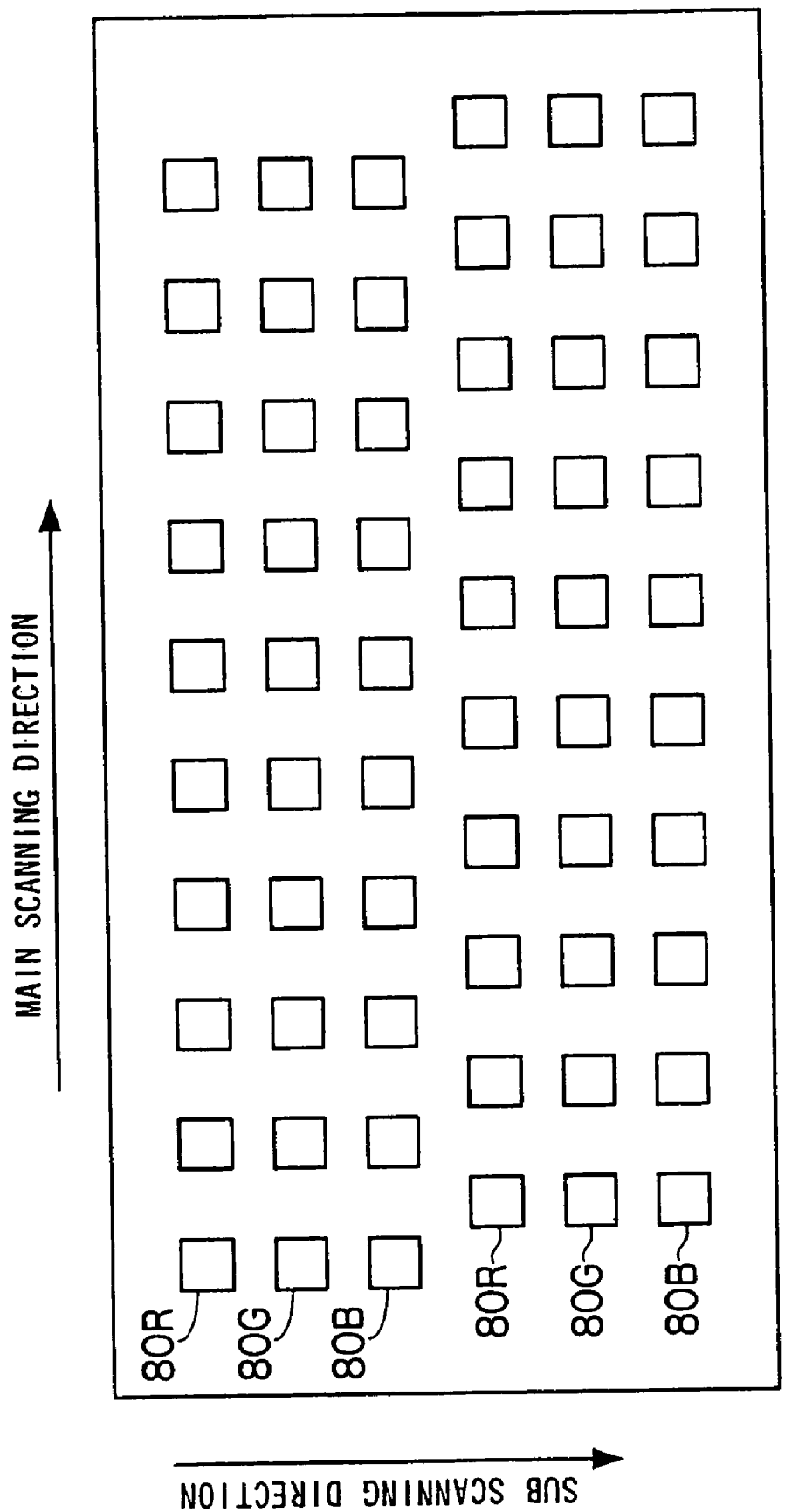
FIG. 12 is a schematic plan view showing an arrangement of organic EL elements formed on a transparent substrate of a conventional exposure apparatus.
Figure 13A:
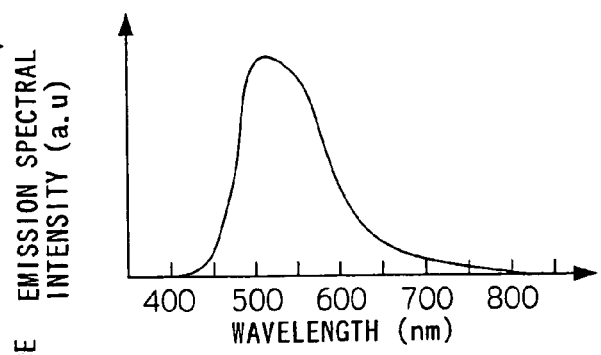
FIG. 13A is a graph showing emission spectral intensity.
Figure 13B:
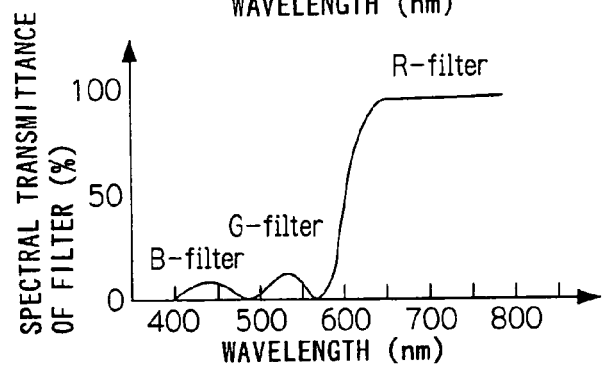
FIG. 13B is a graph showing spectral transmittance of a filter.
Figure 13C:
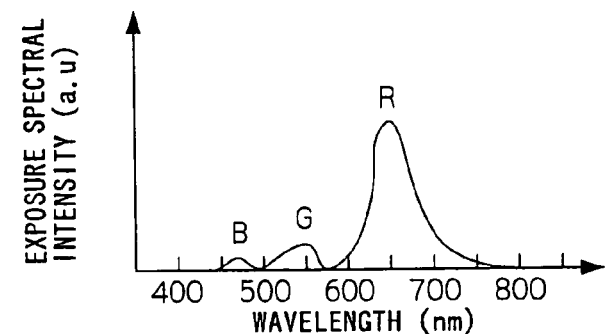
FIG. 13C is a graph showing exposure spectral intensity.
Figure 13D:
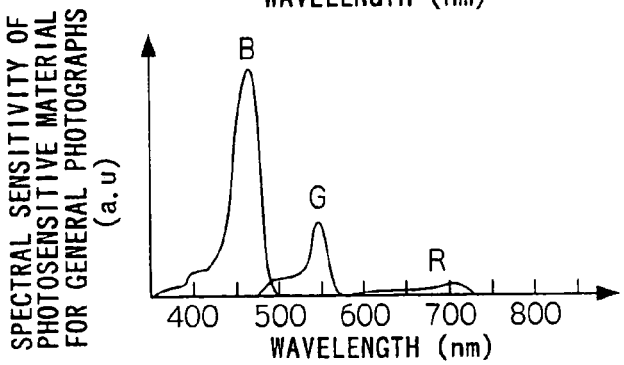
FIG. 13D is a graph showing spectral sensitivity of a photosensitive material.
Figure 13E:
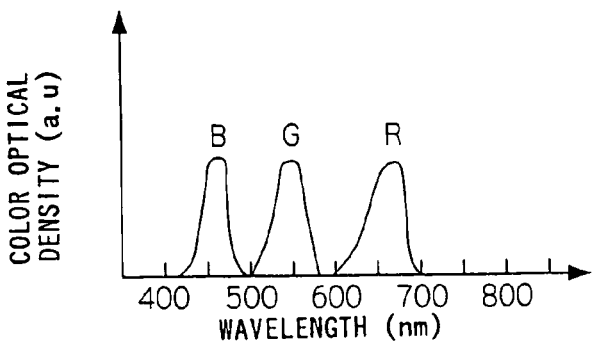
FIG. 13E is a graph showing color optical density of the photosensitive material.

The light amount correction processing is processing to correct light amount by adjusting the drive current values of the respective elements based on the detection values of the photodetector 100 so as to obtain the set desired luminous intensity. When the light amount correction processing is performed, the light amount correction processing routine stored in the ROM is read out and executed. The light amount correction processing routine executed in the control unit 90 will be described by referring to FIG. 11.

In Step 300, the light intensity value detected in the photodetector 100 is captured. As already described, the photodetector 100 is set corresponding to one element of the organic EL array 20, and detects the intensity of light (transmitted light intensity) transmitted through the SLA 30. In the next step 302, initial setting value is read out from the RAM. The initial setting value is the value of the transmitted light intensity in an initial state, and stored in the RAM in advance.

In Step 304, whether or not the transmitted light intensity detected in the photodetector 100 is deviated from the initial setting value is judged, and in the case where the transmitted light intensity is deviated from the initial setting value, the drive current value required for obtaining the same transmitted light intensity as the initial setting value is computed in Step 306, and the computed drive current value is stored as a setting value in the RAM in Step 308. Thereby, the respective organic EL elements will be driven in the next time at constant current with the drive current values newly set, the same transmitted light intensity as the initial state can be obtained. On the other hand, in the case where the transmitted light intensity is not deviated from the initial setting value, the routine is finished. By the above processing, the transmitted light intensities of the respective colors R, G, and B are maintained at the initial setting values, and the light amounts are kept constant.

The timing of adjusting the drive current value can be arbitrarily set at arbitrary interval timings such as 1) at the time when the apparatus is activated, 2) during the time after the termination of exposure of image data for one sheet and before the start of the next exposure, 3) everyday, before starting exposure, 4) at the time of executing calibration mode, 5) at the time of performing degradation amount uniformizing processing, and 6) during exposure sequence.

Other than lowered luminous intensities with degradation of the organic EL elements, in the case where the outdoor air temperature varies or in the case where the ambient temperature within the apparatus varies by continuously using the apparatus for a long time, the emission light amounts of the organic EL elements are varied. Also, in this case, the light amount correction can be performed.

Note that, as mentioned above, in the pulse width modulation drive at constant current, the light amounts are corrected by changing drive current of the respective organic EL elements, however, the method for correcting light amounts can be selected appropriately according to modulation method etc. For example, in the case of pulse width modulation at constant voltage, the drive voltage value is changed to correct light amounts. In the case of pulse width modulation, without changing the drive current value or drive voltage value from the initial state, the way to allocate pulse width is changed to correct light amounts, and in the case of pulse number modulation, the way to allocate pulse number is changed to correct light amounts. Generally, the changes are made to increase the pulse width or the pulse number. In the case of intensity modulation, the way to allocate intensity steps is changed to correct light amounts. Generally, the changes are made to increase the intensity.

Moreover, as mentioned above, intensities of the transmitted light for the respective colors, which is transmitted through the SLA, are detected, whereas, the light amount changes can be detected by outputting a test image for calibration and measuring the density of the image by a densitometer. The densitometer incorporated in the exposure apparatus may be used, or independent densitometer may be used.

What is claimed is:

1. An exposure apparatus comprising:
    a light emitting element array in which plural types of light emitting elements having different emission spectrums are arranged;
    a control unit for generating control signals for causing the plural types of light emitting elements to emit light respectively in predetermined luminous intensities according to the types of light emitting elements so that degradation rates are substantially equal among the plural types of light emitting elements;
    a drive unit for independently driving the plural types of light emitting elements, respectively, based on the control signals generated in the control unit; and
    a filter disposed between the light emitting element array and a photosensitive material to be exposed, and having transmittance adjusted so that exposure intensity corresponding to spectral sensitivity of the photosensitive material can be obtained.

2. An exposure apparatus according to claim 1, wherein the control unit computes cumulative emission amounts with respect to each of the plural types of light emitting elements, and at the time of exposure, generates control signals for causing the plural types of light emitting elements to emit light according to image data, and, after exposure is finished, in order to make a cumulative emission amount of a light emitting element having the greatest cumulative emission amount and cumulative emission amounts of other light emitting elements equal with respect to all of the plural types of light emitting elements, generates control signals for causing at least one of the other light emitting elements to emit light.

3. An exposure apparatus according to claim 1, further comprising a light amount detecting unit for detecting exposure light amounts of the plural types of light emitting elements, wherein the control unit generates control signals for maintaining the exposure light amounts of the plural types of light emitting elements at predetermined values.

4. An exposure apparatus according to claim 1, wherein the plural types of light emitting elements are three types of light emitting elements having emission spectrums that make it possible to form a full color image in relation to a photosensitive material.

5. An exposure apparatus according to claim 1, wherein at least one type of the plural types of light emitting elements is an organic EL element.

6. An exposure apparatus according to claim 1, wherein at least one type of the plural types of light emitting elements is a laser diode element.

7. An exposure apparatus according to claim 1, wherein at least one type of the plural types of light emitting elements is a light emitting diode element.

8. An exposure apparatus according to claim 1, wherein a system for driving the plural types of light emitting elements is a passive matrix drive system.

9. An exposure apparatus according to claim 1, wherein a silver halide color photosensitive material is used as the photosensitive material.

10. The apparatus of claim 1 further comprising a support surface for a photosensitive material to be recorded by the exposure apparatus.

11. The apparatus of claim 10, further comprising a detector to detect a luminous output to the photosensitive material, and the control unit generates control signals based on the detected luminous output.

12. An exposure apparatus comprising:
    a light emitting element array including plural types of light emitting elements having different emission spectrums, the light emitting element array being configured such that plural element rows having plural light emitting elements arranged along a main scanning direction are arranged along a sub scanning direction that intersects with the main scanning direction, and such that the plural types of light emitting elements, numbers of which are respectively determined so as to correspond to a ratio of a number of times of multiple exposure for the respective types of light emitting elements, which is obtained from spectral sensitivities of a photosensitive material to be exposed with respect to the respective types of light emitting elements and luminous intensities of the respective types of light emitting elements: are arranged so as to align along the sub scanning direction;
    a control unit for generating control signals for causing the plural types of light emitting elements to emit light respectively in predetermined luminous intensities according to the types of light emitting elements so that degradation rates are substantially equal among the plural types of light emitting elements having different emission spectrums, and for causing the plural types of light emitting elements to emit light respectively so that a position on the photosensitive material can be subjected to multiple exposure by the plural light emitting elements aligned along the sub scanning direction; and
    a drive unit for independently driving the plural types of light emitting elements, respectively, based on the control signals generated in the control unit.

13. An exposure apparatus according to claim 12, wherein the control unit computes cumulative emission amounts with respect to each of the plural types of light emitting elements, and at the time of exposure, generates control signals for causing the plural types of light emitting elements to emit light according to image data, and, after exposure is finished, in order to make a cumulative emission amount of a light emitting element having the greatest cumulative emission amount and cumulative emission amounts of other light emitting elements equal with respect to all of the plural types of light emitting elements, generates control signals for causing at least one of the other light emitting elements to emit light.

14. An exposure apparatus according to claim 12, further comprising a light amount detecting unit for detecting exposure light amounts of the plural types of light emitting elements, wherein the control unit generates control signals for maintaining the exposure light amounts of the plural types of light emitting elements at predetermined values.

15. An exposure apparatus according to claim 12, wherein the plural types of light emitting elements are three types of light emitting elements having emission spectrums that make it possible to form a full color image in relation to the photosensitive material.

16. An exposure apparatus according to claim 12, wherein at least one type of the plural types of light emitting elements is an organic EL element.

17. An exposure apparatus according to claim 12, wherein at least one type of the plural types of light emitting elements is a laser diode element.

18. An exposure apparatus according to claim 12, wherein at least one type of the plural types of light emitting elements is a light emitting diode element.

19. An exposure apparatus according to claim 12, wherein a system for driving the plural types of light emitting elements is a passive matrix drive system.

20. An exposure apparatus according to claim 12, wherein a silver halide color photosensitive material is used as the photosensitive material.

21. The apparatus of claim 12, comprising an array of drive electrodes arranged in the subscanning direction, wherein each drive electrode activates a first and second row of plural light emitting elements in the subscanning direction, the first and second rows having a common color emission spectrum.

22. The apparatus of claim 21, wherein the first and second rows of plural light emitting elements per drive electrode are arranged such that plural light emitting elements of the first row do not overlap with plural light emitting elements of the second row in the subscanning direction.

23. The apparatus of claim 22, wherein plural light emitting elements of a first drive electrode and a second drive electrode of the plurality of drive electrodes overlap each other in the subscan direction, and the plural light emitting elements corresponding to the first drive electrode and plural light emitting elements corresponding to the second drive electrode are of different color.

24. An exposure apparatus comprising:
a light emitting element array in which plural types of light emitting elements having different emission spectrums are arranged;
a control unit for generating control signals for causing the plural types of light emitting elements to emit light respectively in predetermined luminous intensities according to the types of the light emitting elements; and
a drive unit for independently driving the plural types of light emitting elements, respectively, based on the control signals generated in the control unit,
wherein the control unit computes cumulative emission amounts with respect to each of the plural types of light emitting elements, and at the time of exposure, generates control signals for causing the plural types of light emitting elements to emit light according to image data, and, after exposure is finished, in order to make a cumulative emission amount of a light emitting element having the greatest cumulative emission amount and cumulative emission amounts of other light emitting elements equal with respect to all of the plural types of light emitting elements, generates control signals for causing at least one of the other light emitting elements to emit light.

* * * * *